United States Patent
Pegues et al.

(10) Patent No.: US 9,822,800 B2
(45) Date of Patent: Nov. 21, 2017

(54) FAN FOR A MOTOR VEHICLE COMPRISING A STATOR

(71) Applicant: Valeo Systemes Thermiques, Le Mesnil Saint Denis (FR)

(72) Inventors: Herve Pegues, Rueil-Malmaison (FR); Vincent Zuba, Elancourt (FR)

(73) Assignee: VALEO SYSTEMS THERMIQUES, Le Mesnil Saint Denis (FR)

( * ) Notice: Subject to any disclaimer, the term of this patent is extended or adjusted under 35 U.S.C. 154(b) by 309 days.

(21) Appl. No.: 14/576,832

(22) Filed: Dec. 19, 2014

(65) Prior Publication Data

US 2015/0176605 A1 Jun. 25, 2015

(30) Foreign Application Priority Data

Dec. 20, 2013 (FR) ...................................... 13 63263

(51) Int. Cl.
| | |
|---|---|
| *F04D 29/64* | (2006.01) |
| *B60K 11/02* | (2006.01) |
| *B60K 11/08* | (2006.01) |
| *F04D 19/00* | (2006.01) |
| *F04D 29/54* | (2006.01) |
| *F04D 29/66* | (2006.01) |
| *F01P 1/06* | (2006.01) |
| *F01P 11/10* | (2006.01) |

(52) U.S. Cl.
CPC ............ *F04D 29/646* (2013.01); *B60K 11/02* (2013.01); *B60K 11/08* (2013.01); *F01P 1/06* (2013.01); *F04D 19/002* (2013.01); *F04D 29/544* (2013.01); *F04D 29/661* (2013.01); *F01P 11/10* (2013.01)

(58) Field of Classification Search
CPC .... F04D 29/703; F04D 19/002; F04D 29/544; F04D 29/646; F04D 29/661; F01P 1/10; F01P 1/06; B60K 11/02; B60K 11/08
See application file for complete search history.

(56) References Cited

U.S. PATENT DOCUMENTS

| | | | | |
|---|---|---|---|---|
| 4,685,513 | A | * 8/1987 | Longhouse | ............... F01P 5/06 123/41.49 |
| 6,024,536 | A | * 2/2000 | Tsubakida | .......... B60H 1/00464 415/173.6 |
| 6,139,265 | A | * 10/2000 | Alizadeh | ............... F04D 29/544 415/208.1 |
| D453,960 | S | * 2/2002 | Shelby | ........................ D23/411 |
| 6,398,492 | B1 | * 6/2002 | Cho | ...................... F04D 29/544 415/191 |

(Continued)

*Primary Examiner* — Dwayne J White
*Assistant Examiner* — Sang K Kim
(74) *Attorney, Agent, or Firm* — Howard & Howard Attorneys PLLC

(57) ABSTRACT

The present disclosure relates to a support frame for a ventilation device for cooling a fluid which passes through a cooling circuit of a motor vehicle. The support frame comprises an opening, which is designed to receive a propeller, and a central support, which is positioned in a center of the opening. The central support is formed to receive a motor which activates the propeller, so as to generate a ventilation flow. The central support is attached through the opening to the support frame by retention arms. The retention arms extend according to a curved form, between the central support and a periphery of the opening.

16 Claims, 2 Drawing Sheets

(56) References Cited

U.S. PATENT DOCUMENTS

| | | | | |
|---|---|---|---|---|
| 6,503,060 B1* | 1/2003 | Kamada | ............... | F04D 29/703 |
| | | | | 415/121.2 |
| 6,910,862 B2* | 6/2005 | Horng | ............... | F04D 29/544 |
| | | | | 415/211.2 |
| 7,156,615 B2* | 1/2007 | Horski | ............... | F04D 29/601 |
| | | | | 415/119 |
| 7,811,055 B2* | 10/2010 | Stommel | ............... | F01P 5/06 |
| | | | | 415/191 |
| 2008/0078340 A1* | 4/2008 | Havel | ............... | F04D 29/544 |
| | | | | 123/41.49 |
| 2008/0223558 A1* | 9/2008 | Otsuki | ............... | F04D 29/582 |
| | | | | 165/121 |

* cited by examiner

FAN FOR A MOTOR VEHICLE COMPRISING A STATOR

RELATED APPLICATIONS

This application claims priority to and all the advantages of French Patent Application No. FR 13/63263, filed on Dec. 20, 2013, the content of which is incorporated herein by reference.

The field of the present invention is that of motor vehicles, and more particularly that of circulation of the air for cooling the equipment of the vehicle, in particular its engine.

Vehicles with a thermal engine need to discharge the calories generated by their functioning, and for this purpose they are equipped with heat exchangers, in particular a cooling radiator, which are placed at the front of the vehicle, and through which air from the exterior passes. A fan is placed upstream or downstream in order to force the circulation of the air through this/these exchanger(s).

With the geometry of the propeller defined, it is known to retain the fan by means of a support which is generally disposed downstream from the propeller. The support can be constituted by a nozzle or a flat plate pierced by a central opening which corresponds to passage of the air, and is situated in the extension of the propeller. This central hole has connection arms passing through it which ensure the mechanical stability of the assembly, and in particular that of the motor of the propeller. These arms can be simple arms, when the intention is to provide them only with a function of mechanical stability, or they can be arms in the form of stators, when the intention is also to provide them with an aerodynamic function. Unlike simple arms, the stators are formed by slender elements in the form of wings, with an aerodynamic profile suitable for the speed and direction of the air which passes through the propeller support.

However, it is necessary to reduce as far as possible the impact of these arms or stators on the flow which passes through the propeller support, by disturbing the circulation of this air as little as possible. The efficiency of the support and its arms or stators is characterized by an aeraulic performance, which represents the loss of air pressure caused by passage of the air through this support.

Various devices have been designed for this purpose. Thus, straight arms are known, which are of a limited number and extend radially, and the cross section of which has an axis of symmetry oriented according to the direction of the axis of rotation of the rotor blades.

Stator profiles are also known which are optimized to have minimum drag in the flow of air. The thickness of these stator blades is then necessarily thin, and the total number of stator blades must be increased substantially in order to ensure good mechanical stability. This results in a coefficient of transparency of the stator, i.e. a total frontal surface of the blades relative to the cross section of passage of the air, which is quite poor. The aeraulics performance of a stator of this type is thus low.

It is therefore necessary to attempt to improve further the aerodynamic performance of the fans at the front surface of motor vehicles, in particular by obtaining good aeraulic performance for its propeller support, associated with a high level of transparency, whilst guaranteeing good mechanical stability for this support.

For this purpose, the subject of the invention is a support frame for a ventilation device for cooling of a fluid which passes through a cooling circuit of a motor vehicle, the said frame comprising an opening which is designed to receive a propeller, and a central support which is positioned in the center of the said opening, and is formed such as to receive a motor which activates the said propeller, so as to generate a ventilation flow, the said central support being attached through the said opening to the frame by retention arms.

According to the invention, the said retention arms extend according to a curved form, between the central support and the periphery of the said opening. "Extend according to a curved form" means that the said arms are not straight, and in particular they are not radial. Thus, they have curved leading and/or trailing edges.

The curved form improves the aeraulic performance by reducing the recirculations of air downstream from the propeller, and reducing the associated vortices.

Advantageously, the curvature of the said arms develops constantly, in the same direction, between the central support and the periphery of the said opening.

Preferably, the curvature of the said arms is configured to develop in the direction of rotation of the propeller. This configuration assists the reduction of the recirculations, and thus an improved aeraulic performance.

According to one embodiment, the said arms extend radially at the level of the central support.

And in a particular embodiment, the said arms are connected to the periphery of the said opening according to an angle of between 30 and 60° relative to the radial plane. Preferably, the said arms are connected to the periphery of the said opening according to an angle of 45° relative to the radial plane.

Advantageously, in cross section the said arms have a form in the shape of a "U" or a "V" with a rounded point, which is preferably symmetrical in the axial direction. The said arms thus have branches which extend from an apex. This cross section, which is relatively thick in comparison with stator blades, provides great rigidity, which makes it possible to reduce the number of arms, and therefore increases the transparency of the support frame.

Preferably, the arms additionally comprise a central rib which is positioned between the branches of the said "U" or "V". This therefore increases the rigidity further, and it is possible to reduce the number of arms necessary for the mechanical stability of the assembly.

Advantageously, the frame is configured such that the apex of the arms faces the side of the frame which is designed to face the propeller. This therefore ensures good flowing of the flow of air.

The invention also relates to a ventilation device comprising a propeller, the motor of which is supported by a support frame as previously described.

Advantageously, the number of arms of the device is lower by at least two units than the number of blades of the propeller. Preferably, the number of arms is 5 at the most.

Finally, the invention relates to a module for cooling of the engine, comprising a ventilation device as previously described.

The invention will have its applications in particular as a ventilation device and/or a cooling module of a thermal engine placed at the front surface of a motor vehicle.

The invention will be better understood, and other objects, details, characteristics and advantages of it will become more apparent during the following detailed explanatory description of an embodiment of the invention provided purely by way of illustrative and non-limiting example, with reference to the appended schematic drawings.

Figure 1:
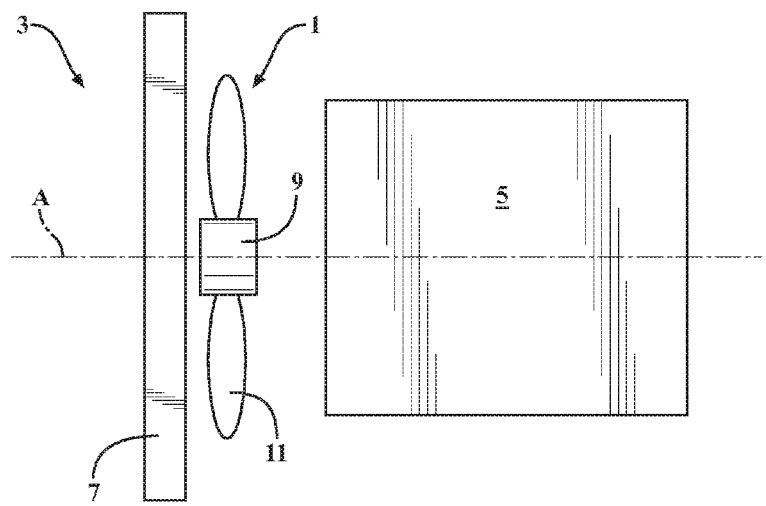
FIG. 1 is a simplified and schematic view of a cooling module of an engine unit of a motor vehicle.

FIG. 1 shows a cooling module 3 of a motor vehicle engine unit 5. In particular it comprises a ventilation device, commonly known as a fan 1, and a heat exchanger 7 such as a cooling radiator. The fan 1, which in this case is positioned between the cooling radiator 7 and the engine unit 5, can be arranged either at the front or at the rear of the radiator 7. These elements 1, 5 and 7 are substantially aligned axially.

The propeller of the fan 1 is mounted such as to rotate around an axis A. When the propeller is rotated, for example by an electric motor (not represented), it stirs the air and drives it through the radiator. The flow of air flows according to a direction of flowing which is oriented substantially from the radiator 7 towards the engine unit 5.

Hereinafter in the description, the terms "upstream" and "downstream" refer to the direction of flowing of the flow of air, and the terms "radial", "axial" or "tangential" refer to the axis of rotation of the propeller.

Figure 2:
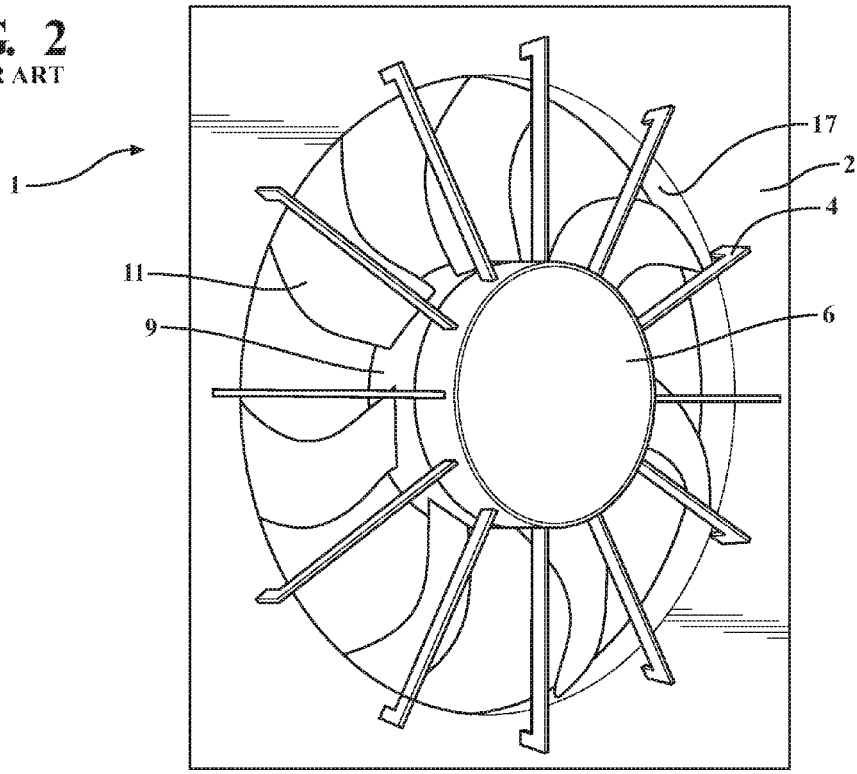
FIG. 2 is a view in perspective of a ventilation device for a motor vehicle, provided with simple arms for retention of the propeller, according to the prior art.

FIG. 2 shows a fan 1 according to the prior art, comprising a propeller comprising blades 11 and a nozzle or support 2 which form a frame to support the propeller, and in this case is positioned downstream from the propeller. On the support frame 2 there are secured radial arms 4, which are disposed on the circumference of the central opening 17 of the support 2, in order to allow the passage of the ventilation flow. These arms are simple flat arms which extend radially, and are oriented in a straight manner on the radial plane on which they extend. Consequently, their direction does not interact with the flow which passes through the fan, and they do not have any influence on the flowing, apart from generation of a drag force caused by the friction of the air, which results in a decrease in the transparency of the support.

The arms 4 are secured, on the peripheral side of the central opening, on the support frame 2 of the propeller, and they meet in the center on a cover which forms a fixed central support 6. Inside this cover there are secured bearings (not shown in the figure), which support the axis of rotation of the hub 9 of the propeller. The propeller can thus rotate inside the central opening 7 provided in the support 2, under the action of the electric motor which is positioned in the central support 6.

Figure 3:
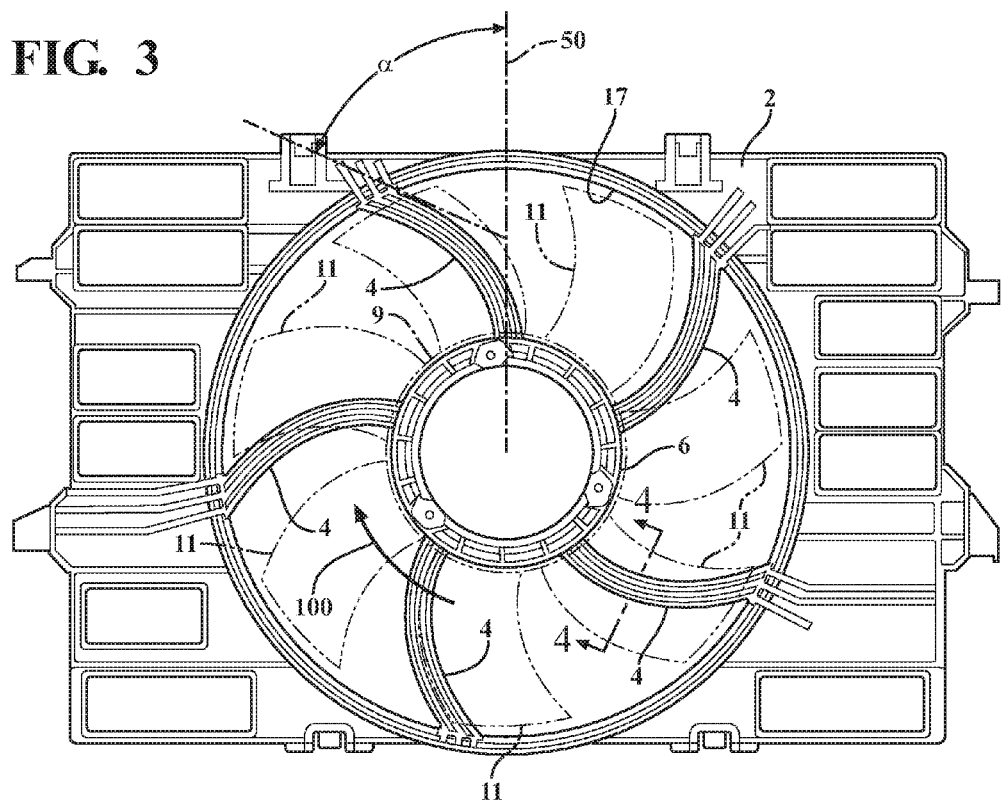
FIG. 3 is a view of the rear of a ventilation device for a motor vehicle engine, provided with arms for retention of the propeller, according to the invention.

FIG. 3 shows a propeller support frame or nozzle 2 according to the invention, in a configuration with five arms which pass through its central opening 17. Unlike the prior art, the arms have a curved form between the central support 6 and the periphery of the nozzle 2. The arms 4 extend initially from the central support 6, in this case substantially radially, and then curve progressively relative to a radial plane 50 as they move away from the center of the nozzle 2, and reach an angle α of approximately 45° relative to this radial plane 50 when it reaches the periphery of the nozzle 2 (i.e., the angle α is measured between a tangential plane corresponding to the connection of the arm 4 to the periphery of the nozzle 2 and the radial plane 50). This angle α can be different from this value, depending on the aerodynamic conditions imposed by the propeller 11, and it can vary in a range from 30 to 60°, in order to retain a given level of efficiency as far as the performance of the propeller support 2 is concerned.

According to the invention, the direction imparted to the curvature is preferably the same as that of rotation of the propeller, which is shown by an arrow 100 in FIG. 3.

The number of arms 4 can vary according to the number of blades 11 of the propeller 9, for the purpose of avoiding the acoustic excitations which can be produced by the passage of the propeller blades 11 in front of the arms 4. In the example represented in FIG. 3, which corresponds to a propeller 9 with seven blades 11, the number of arms 4 is five, as previously stated. It can be seen that it is sufficient to have a relatively small number of arms 4 in order to ensure the necessary mechanical stability of the propeller 9 and thus obtain good transparency of the ventilation device 1. Taking into account the rigidity of the arms 4 provided by the curved form with which they are provided, it is possible to put into place a number of arms 4 smaller than the number of blades 11, contrary for example to the stators according to the prior art. A difference of two units between these two numbers makes it possible in general to guarantee the absence of acoustic excitations.

The said arms 4 are advantageously regularly spaced angularly around the central support 6.

Figure 4:
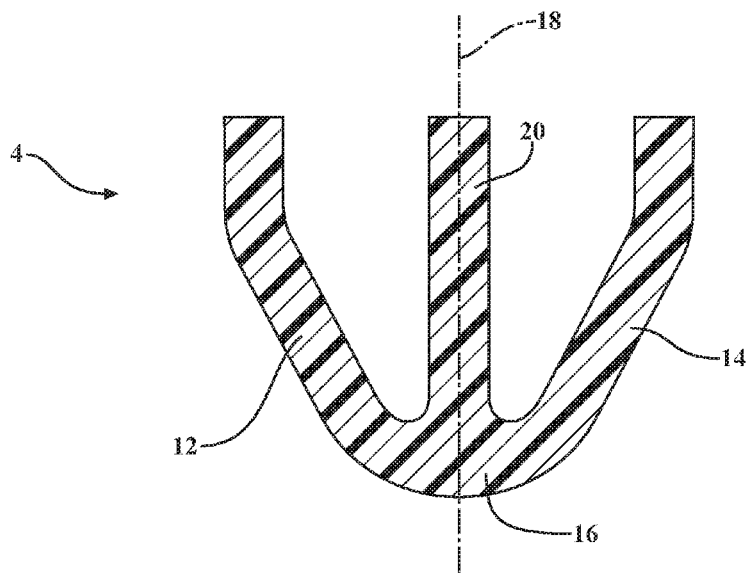
FIG. 4 is a view in tangential cross section of an arm for retention of the device in FIG. 3.

FIG. 4 shows a view in tangential cross section of an arm of the propeller support 2. It has a so-called "V-U" form which is halfway between the rounded form of a "U" and the pointed form of a "V", and represents a good compromise for obtaining firstly a low drag and maximum aeraulic performance, and secondly a thickness which is sufficient to provide the required rigidity, without detracting excessively from the transparency of the ventilation device 1.

In other words, the arms have two branches 12, 14 which extend from a rounded apex 16. The said arms 12, 14 are for example symmetrical relative to an axis 18 parallel to the axis of rotation of the propeller. In this case, they comprise a first portion which is inclined relative to their axis 18, which extends from the said apex 16, and is prolonged by a second portion parallel to their axis 18.

In the example represented, the rigidity of the arm is increased by the introduction of an additional rib 20 between the two outer branches of the "V-U", the rib being oriented according to the axis of symmetry 18 of the arm. The rigidity provided by this additional rib makes it possible to reduce the number of arms, and thus, even if each thick arm tends to detract from the transparency of the support, it makes it possible to retain a low level of global transparency and a high level of aeraulic performance.

The invention thus consists of reducing the number of arms supporting the motor of the propeller of a ventilation device of a motor vehicle, for the purpose of reducing their impact on the transparency of the ventilation device, whilst providing the arms with a thickness which is sufficient to ensure the mechanical stability of the assembly.

The aeraulic performance of this device is preserved by providing these arms with a curved form which is oriented in the direction of the rotation of the blades of the propeller. The curved form advocated acts on the turbulence observed at the output of the propeller plane, and reduces the recirculation of the air in the direction of the propeller. This results in a significant improvement of the aeraulic performance of the ventilation device, which remains high, despite the thickness of the arms in comparison with stator blades which a priori would be better suited because of their better aerodynamics, but would have worse transparency.

The invention claimed is:

1. A support frame for a ventilation device for cooling a fluid which passes through a cooling circuit of a motor vehicle, the support frame comprising an opening, which is designed to receive a propeller, and a central support which is positioned in a center of the opening, with the central support formed to receive a motor which activates the propeller so as to generate a ventilation flow, and with the central support being attached through the opening to the support frame by retention arms, wherein the retention arms extend according to a curved form, between the central support and a periphery of the opening,

- wherein in a transverse cross section the arms have a V-U form with a rounded point, with branches which are symmetrical in an axial direction around an apex, and
- wherein each of the arms comprise a first portion extending linearly from the apex in an inclined manner and a second portion extending from the first portion parallel to the axial direction.

2. A support frame according to claim 1, wherein the curvature of the arms develops progressively, in the same direction, between the central support and the periphery of the opening.

3. A support frame according to claim 2, wherein the curvature is configured to develop in a direction of rotation of the propeller.

4. A support frame according to claim 1, wherein the arms extend radially at a level of the central support.

5. A support frame according to claim 1, wherein the arms extend radially at a level of the central support so as to define a radial plane, and wherein the arms are connected to the periphery of the opening opposite the central support, wherein an angle α between the radial plane and a tangential plane corresponding to the connection of the arms to the periphery opposite the central support is between 30 and 60°.

6. A support frame according to claim 5, wherein the angle α is 45°.

7. A support frame according to claim 1, wherein the arms additionally comprise a central rib which is positioned between the branches.

8. A support frame according to claim 1, configured such that the apex of the arms faces a side of the support frame which is designed to face the propeller.

9. A ventilation device comprising a propeller, the motor of which is supported by a support frame according to claim 1.

10. A ventilation device according to claim 9, wherein a number of arms is lower by at least two units than a number of blades of the propeller.

11. A ventilation device according to claim 9, wherein the number of arms of which is 5 at the most.

12. A module for cooling of a thermal engine of a motor vehicle, comprising a ventilation device according to claim 9.

13. A support frame according to claim 2, wherein the arms extend radially at a level of the central support.

14. A support frame according to claim 2, wherein the arms extend radially at a level of the central support so as to define a radial plane, and wherein the arms are connected to the periphery of the opening opposite the central support, wherein an angle α between the radial plane and a tangential plane corresponding to the connection of the arms to the periphery opposite the central support is between 30 and 60°.

15. A support frame according to claim 1, wherein the arms additionally comprise a central rib which is positioned between the branches.

16. A support frame according to claim 15, wherein the central rib extends in a direction from the apex parallel to the second portion of each of the arms.

* * * * *

UNITED STATES PATENT AND TRADEMARK OFFICE
CERTIFICATE OF CORRECTION

PATENT NO. : 9,822,800 B2  
APPLICATION NO. : 14/576832  
DATED : November 21, 2017  
INVENTOR(S) : Herve Pegues et al.

Page 1 of 1

It is certified that error appears in the above-identified patent and that said Letters Patent is hereby corrected as shown below:

On the Title Page

Assignee: please delete "VALEO SYSTEMS THERMIQUES" and replace with -- VALEO SYSTEMES THERMIQUES --

Signed and Sealed this
Sixth Day of March, 2018

Andrei Iancu
*Director of the United States Patent and Trademark Office*